United States Patent [19]
Brosene, Jr.

[11] 3,851,694
[45] Dec. 3, 1974

[54] WHEEL RIM PROTECTOR

[75] Inventor: William G. Brosene, Jr., Cincinnati, Ohio

[73] Assignee: Magnum Automotive Equipment, Inc., Cincinnati, Ohio

[22] Filed: Sept. 24, 1973

[21] Appl. No.: 400,389

[52] U.S. Cl. ............................................... 157/1
[51] Int. Cl. ............................................. B60c 25/00
[58] Field of Search.................... 157/1, 1.22, 1.24; 145/35 D

[56] References Cited
UNITED STATES PATENTS
| | | | |
|---|---|---|---|
| 2,923,346 | 2/1960 | Twiford | 157/1 |
| 3,219,079 | 11/1965 | Stambol | 143/35 D |
| 3,493,028 | 2/1970 | Strang et al. | 157/1 |

FOREIGN PATENTS OR APPLICATIONS
| | | | |
|---|---|---|---|
| 830,747 | 3/1960 | Great Britain | 145/35 D |

Primary Examiner—Al Lawrence Smith
Assistant Examiner—Harold P. Smith
Attorney, Agent, or Firm—Wood, Hernon & Evans

[57] ABSTRACT

A rim protector adapted to be seated on the rim of a wheel so as to at least partially enclose that rim during mounting or demounting of a tire. The rim protector is in the nature of a length of tubing slit longitudinally along its length from one end to the other, the tubing being slipped over and seated on the rim. The tubular rim protector protects the rim against scratches from, as well as provides a bearing surface for, a tire mount-/demount tool during rotation of that tool about the rim as a tire is mounted onto or demounted from the wheel.

4 Claims, 3 Drawing Figures

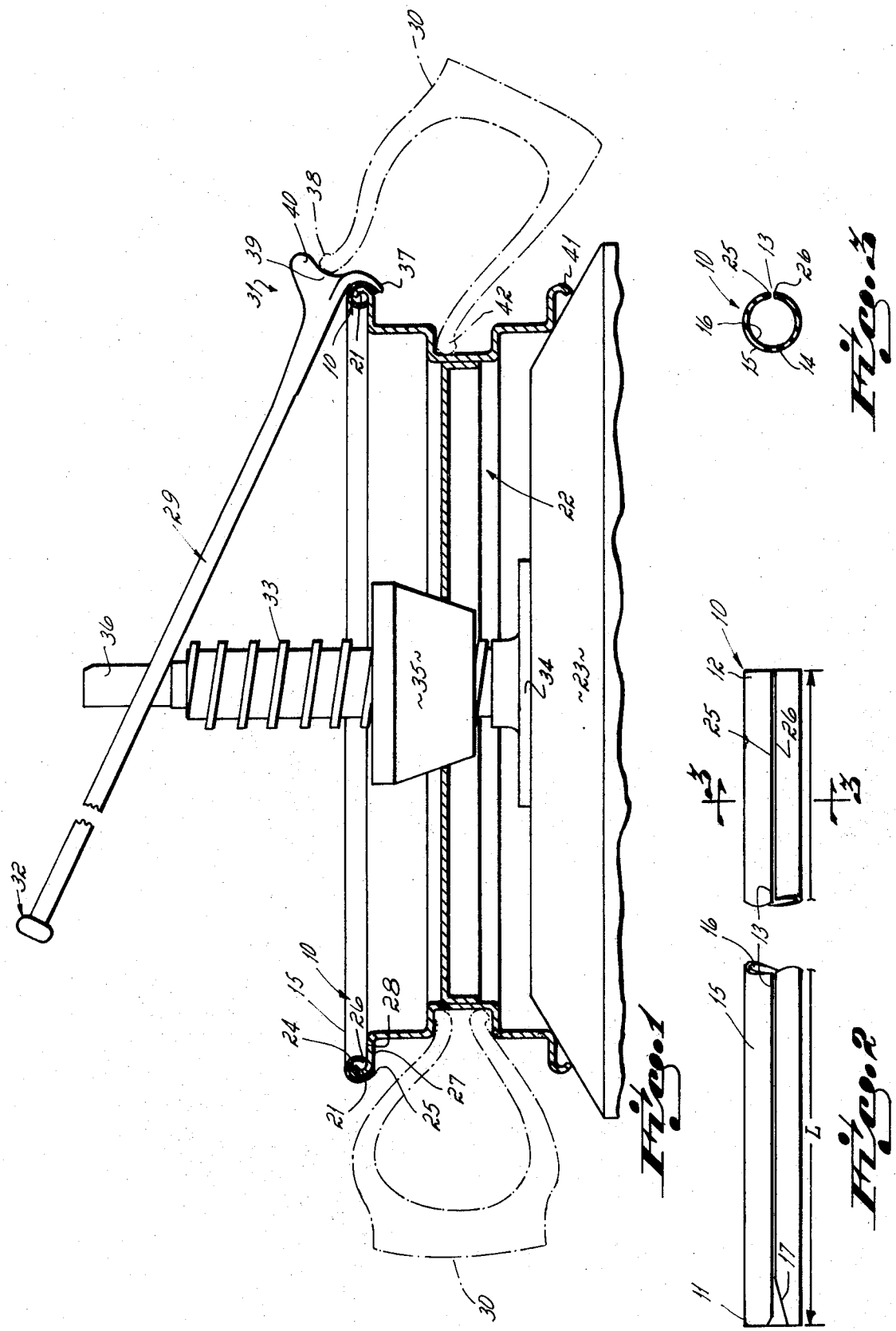

WHEEL RIM PROTECTOR

This invention relates to the mounting and demounting of tires. More particularly, this invention relates to a device particularly adapted to protect the rim of a wheel as a tire is being mounted onto or demounted from that wheel.

The mounting of a pneumatic tire on a wheel, and the demounting of a pneumatic tire from a wheel, used to be done totally by hand. Such provided major problems for an operator in that a pneumatic tire's beads are relatively inflexible. In mounting a tire on a wheel, the tire's beads must somehow be disposed over one of the wheel's rims into the wheel's well area so as to positively locate the tire on the wheel. In demounting the tire from the wheel, the tire's beads must be somehow removed from the wheel's well area over one of the wheel's rims so that the tire is free of the wheel. Thus, one main objective of an automatic tire changer machine is to aid an operator in demounting a worn pneumatic tire from a wheel, and to aid an operator in mounting a new pneumatic tire onto a wheel.

Over the years a number of different types of automatic tire changing machines have been developed which provide means to mechanically assist an operator in mounting a tire onto, and demounting a tire from, a wheel. Generally speaking, the major structural components of an automatic tire changer machine include a horizontally disposed table on which the wheel is initially positioned, an automatically rotatable centerpost that extends up from the table through the center of the wheel, and a mount/demount tool that functions to lift an old tire's beads over the rim off the wheel when an old tire is being demounted and to position a new tire's beads over the rim onto the wheel when a new tire is being mounted. The mount/demount tool is interconnected with the centerpost, and is mechanically rotated relative to the wheel by a power unit through that interconnection, to aid an operator in performing the tire mounting and demounting functions.

In mounting a tire on a wheel, the tire tool is cooperatively engaged with the centerpost. The tire tool extends outwardly from the centerpost in a radial fashion, the centerpost in effect providing a vertical axis about which the tire tool is rotated for a single revolution or slightly less, as well as providing the drive means to work the tool's mounting head around the tire's beads to locate the beads over the wheel's rim. Of course, a suitable power unit must be drivingly connected with the centerpost so that same can be mechanically rotated about its vertical axis. During such rotation, the tire tool's mounting head rests on and engages the wheel's rim, and cooperates with the tire's beads to aid in locating those beads within the wheel's well area so as to position the tire on the rim.

In demounting a tire from a wheel, the tire tool is also cooperatively engaged with the centerpost. The tire tool likewise extends outwardly from the centerpost in a radial fashion, the centerpost again providing the vertical rotational axis for the tire tool as the tool's demounting head is worked around the tire's beads to lift the beads over the wheel's rim and off the wheel. The same power unit is employed to rotate the centerpost whether the tool's mounting head or demounting head is cooperatively engaged with the wheel. During rotation of the demounting head, the demounting head rests on the wheel's rim and engages the tire's beads to aid in lifting the beads out of the wheel's well area and over the rim so as to free the tire from the rim.

As mentioned, and whether the tool's mounting or demounting head is cooperatively engaged with the wheel's rim and tire's bead, i.e., whether the tire is being mounted onto or demounted from the wheel rim, the tool's head rests on and cooperates with the wheel rim's edge or outermost flange portion to aid in lifting the tire's beads off the rim or positioning the tire's beads onto the rim. This cooperation occurs as the tire tool is rotated by the centerpost, the tool's operational head sliding over or rubbing on the wheel rim's flange edge during such rotation. Thus, the wheel's rim, in effect, provides a bearing surface that cooperates with the tool's head to aid in mounting or demounting the tire with the wheel.

In today's automobile market, the so-called mag wheel has become relatively popular. The three primary uses of mag wheels are for prestige purposes (e.g., on top-of-the-line sport cars), for decorative purposes (e.g., so-called hot-rod cars), and for high-performance purposes (e.g., racing cars). The mag wheel is particularly sought by automobile owners who want their cars to present a sporty or high-performance appearance. The mag wheel is mainly an automobile after-market item, i.e., it is mainly sold to car owners that wish to replace the wheels originally supplied by the automobile manufacturer with the more sporty or high-performance appearing mag wheels. However, mag wheels are also provided as original equipment on certain prestige cars, e.g., top-of-the-line sport models, by automobile manufacturers.

Mag wheel, as used in this application, refers to any type wheel which may be marred or scratched or otherwise made unattractive and aesthetically undesirable when a tire is mounted onto and/or demounted therefrom by means of a tire tool used, e.g., in combination with an automatic tire changer machine. Mag wheels, as manufactured, may be fabricated of chrome-plated steel, of machine-turned aluminum, of machine-turned magnesium, or may be a combination type wheel of steel/aluminum or steel/magnesium. The mechanically rotated tire tool of an automatic tire changer machine, in certain instances, easily mars the exposed rim surfaces of the mag wheel as a tire is mounted onto or demounted from that wheel. This occurs because of the fact that the wheel's rim provides a bearing surface in cooperating with the tire tool's mount/demount head during the mounting and demounting operations. Of course, such is undesirable from a customer standpoint; those persons who use mag wheels are usually most conscious of the outward or aesthetic appearance of their automobiles, and are quite insistant on having tires changed without any undue marring or scratching or the like of the mag wheels.

This problem has been recognized in the prior art. There are two primary solutions which are available to an automatic tire changer machine's operator when that operator must change the tire on a mag wheel. The first and most commonly used solution is simply to coat or slop the wheel's rim with a heavy coating of lubricant, e.g., a tire bead lubricant, thereby substantially reducing the friction coefficient of the mag wheel's rim so as to allow the tire tool to slide thereover without undue scraping or marring of the rim edge. The second solution is a structural one, and involves a steel band with a U-shaped cross section that fits over the wheel's rim. The steel band is clamped by a toggle bolt type arrangement to draw the band tight onto the wheel's rim. The first solution is, of course, quite sloppy; furthr this solution may even lead to a safety hazard in the form of a slippery floor in that area where the tire machine is located if undue quantities of the lubricant fall on the floor. The second solution has a couple of drawbacks; the U-shaped band structure is expensive, the structure is relatively difficult to use, and the U-shaped band tends to slip around the wheel's rim unless the toggle bolt is drawn completely tight (this causes more potential marring and scraping damage to the wheel than the tire tool itself might cause).

Thus, it has been a primary objective of this invention to provide a novel rim protector for a wheel when a tire is being mounted onto or demounted from that wheel by use of a tire tool.

In accord with this objective, this invention provides a rim protector adapted to be seated on the rim of a wheel so as to at least partially enclose that rim during use mounting or demounting of a tire. The rim protector is in the nature of a length of tubing slit longitudinally along its length from one end to the other, the tubing being slipped over and seated on the rim. The tubular rim protector protects the rim against scratches from, as well as provides a bearing surface for, a tire mount/demount tool during rotation of that tool about the rim as a tire is mounted onto or demounted from the wheel.

Other objectives and advantages of this invention will be more apparent from the following detailed description taken in conjunction with the drawings in which:

FIG. 1 is a side elevational view illustrating the rim protector of this invention in operative combination with a wheel, that wheel being horizontally positioned on the table of an automatic tire changer machine;

FIG. 2 is a plan view illustrating the structure of the rim protector of this invention; and FIG. 3 is a cross sectional view taken along line 3—3 of FIG. 2.

As illustrated in FIG. 2, the rim protector 10 of this invention is in the nature of a length L of generally toroidal shaped tubing that is completely hollow from one end to the other, the tubing being open at each end 11, 12. The tubing is provided with a longitudinal slit 13 that extends from one end 11 thereof to the other 12, that slit extending completely through the tubing's side wall 14 from the outside surface 15 to the inside surface 16 so that the tubing may be spread apart or opened up along its length. Further, a notch 17 is cut out at that location on the tubing's periphery which intersects the longitudinal slit 13 provided in the tubing. This notch is of definite help to the operator in the use of the rim protector as will be explained in detail below.

Preferably, the rim protector 10 is about 44 inches in length when laid out in a straight line. This length services all of the most common size wheels. The most common size wheels are 13 inch, 14 inch, 15 inch or 16 inch in diameter. Also, it is preferred that the tubing 10 have good spring and memory characteristics, i.e., it must be able to return to a generally circular cross-sectional configuration (see FIG. 3) time after time after being repeatedly sprung open into the use attitude (see FIG. 1). Further, it is important that the tubing have a relatively slick or smooth outer surface, and that this outer surface be abrasive resistant, to withstand a tire tool's abrasion as the tool's head rubs thereover. It has been found that a nylon tubing having a 0.50 inch outside diameter and a 0.062 inch wall thickness is particularly useful; the preferred tubing is that marketed under Grade N2 by Samuel A. Moore and Co., Mantua, Ohio 45255.

In use, the rim protector 10 of this invention is adapted to slip over and be seated on, i.e., to enclose at least partially, the upper rim 21 of a wheel 22 when that wheel is horizontally disposed on the table 23 of an automatic tire changer machine. The tubing 10 is initially introduced over the rim's edge 24 by first disposing the notch 17 over the rim's edge and then working the tubing around the rim's edge by springing it open and pushing it down over the rim's edge. Once in place on the wheel 22, the opposed sides 25, 26 of the slit 13 in the rim protector 10 grip opposite sides 27, 28 of the rim throughout the entire length L of the rim protector. This is effective in holding the rim protector 10 in desired location on the wheel, i.e., is effective in preventing the rim protector from slipping around the wheel's periphery as the tire tool is rotated during the mounting or demounting operation, and occurs because of the spring characteristics of the tubing.

When the tubing's length L is of approximately 44 inches, and as mentioned, same is useful for any diameter wheel 22 from a 13 inch to a 16 inch diameter. The 44 inch tubing length, when used with 13 to 16 inch diameter wheels, insures that no overlap of the tubing ends 11, 12 will occur even for the smaller diameter rims, i.e., insures that a gap (not shown) between the tubing ends of some extent will always be present when the protector is installed on the wheel's rim 21. However, this gap is not of any consequence for the reason that a tire mount/demount tool 29 on most commercially available automatic tire changer machines generally oscillates back and forth within an arc between about 180° and about 270°. That is, the tire mount/demount tool 29 does not make even a single full revolution, let alone multiple revolutions, in mounting or demounting a tire 30 from the wheel 22; the tool's mounting 31 and demounting 32 heads simply oscillate between a starting position and a stopping position, and the oscillation arc for each generally is somewhere between about 180° and 270°. Thus, and in use, the rim protector 10 is positioned on the wheel's rim 24 in such a manner that the gap between opposed ends 11, 12 of the tubing is located in that 90° or more arc where the tire tool's heads 31, 32 do not function.

A tire tool 29 is shown in combination with a part of an automatic tire changer machine in FIG. 1, the rim protector 10 already being disposed on the top rim's edge 24 of the wheel 22 in operational position as previously described. An automatic tire changing machine is more particularly described in U.S. patent application Ser. No. 328,008 filed Jan. 30, 1973, entitled UPPER BEAD BREAKER MECHANISM, invented by William G. Brosene, Jr. and David W. Besuden, and U.S. patent application Ser. No. 328,017 filed Jan. 30, 1973, now U.S. Pat. No. 3,807,477, entitled BEAD BREAKER MECHANISM, invented by John T. Curtis. A mechanism for mechanically rotating the machine's centerpost 32 is more particularly set out in U.S. patent application Ser. No. 328,016 now abandoned, filed Jan. 30, 1973, entitled CENTERPOST DRIVE MECHANISM, invented by William G. Brosene, Jr. A tire tool 29 having a mounting head 31 particularly useful in connection with the rim protector 10 of this invention is illustrated in U.S. patent application Ser. No. 328,010, filed Jan. 30, 1973, now U.S. Pat. No. 3,823,756, entitled MOUNTING HEAD FOR A TIRE TOOL, invented by Donald E. Rainey.

As shown in FIG. 1, the automatic tire changer machine includes the horizontally disposed table 23. A threaded cylinder 33 is fixed to the table through collar 34, hold down cone 35 being threaded onto that cylinder. The wheel 22 is held in fixed location on the table 23 by the hold down cone 35. The centerpost 36 extends from below the table 23 up through the threaded cylinder (and, hence, through the wheel's center hole). The centerpost 36 is rotatable relative to the fixed threaded cylinder, and is so rotated by means (not shown) beneath the table 23. The top rim 24 of the wheel 22 is, of course, disposed horizontally when the wheel is located or positioned on the table for mounting or demounting of a tire 30.

Use of the rim protector 10 of this invention is particularly illustrated in connection with the mounting head 31 of a tire tool 29, the tire 30 being mounted onto the wheel 22 as illustrated in FIG. 1. In use, the tool 29 is drivingly connected with the machine's centerpost 32, and the mounting head's lip 37 is interengaged with the wheel's rim 24 so that the rim is interposed between the lip and the centerpost. However, the presence of the rim protector 10 over the rim's edge prevents direct contact of the mounting head with the rim 24 (and, thereby, prevents marring or scraping of the rim by the tool's head 31 during rotation of the tool 29) even though the functional interengagement remains during rotation of the tool 29. In this attitude the tire's bead 38 is cradled in the mounting head's mouth 39. The centerpost 32 is mechanically rotated, the mounting head's forehead 40, lip 37 and mouth 39 being maintained in correct radial relation relative to the centerpost because of lip 37 overlying the wheel's rim 24 (and rim protector 10 thereon). As the mounting head 31 is rotated, and because the tire's bead 38 is cradled in the mouth 39 (and cannot escape therefrom due to the forward angularity of the mounting head's forehead 40) the bead is forced down over the mounting head's lip 37 and, hence, over the wheel's rim 24 until the entire bead is located between the wheel's opposed rims 24, 40, 41 in fully mounted position. Both the top 37 and bottom 42 beads of the tire 30 are mounted in this fashion, the posture of the tire illustrated in FIG. 1 being substantially fully mounted as illustrated.

The spring characteristics of the nylon tubing from which the rim protector 10 is fabricated causes the rim protector to grip the wheel's rim 24 along the entire length L (except in notch 17 area) of the longitudinal slot 13 provided therein. This is most useful in maintaining the rim protector in installed position on the wheel's rim, i.e., in preventing slippage of the rim protector around the rim's periphery, in light of the forces which bear thereupon as the tool's mounting head 31 slides over the rim protector 10 during rotation of the tool 29. Further, the slick or smooth outer surface of the tubing 10 allows the mounting head's lip 37 to slide thereover as the tool is rotated by the centerpost 36, thereby providing no material hinderance to operation of the tire changing machine. Further, and because the tubing 10 is relatively abrasion resistant, its relatively smooth outer surface is not materially impaired after repeated mounting or demounting cycles even in light of the fact that the outside surface of the rim protector 10 must provide a bearing surface for the tool's mounting and demounting heads.

After the tire 30 has been fully mounted onto, or demounted from, the wheel 22, the rim protector 10 is simply removed from interengagement with the wheel's rim 24 and stored. That is, the tubing 10 is simply sprung open slightly along its length L and lifted off the wheel's rim 24. The tubing's spring memory characteristic then allows it to return to the generally cross-sectional configuration illustrated in FIG. 3.

Having described in detail the preferred embodiment of my invention, what I desired to claim and protect by Letters Patent is:

1. A method of protecting a rim of a wheel during the mounting or demounting of a tire, including the steps of slitting a length of generally toroidal shaped tubing longitudinally along its length from one end to the other, said tubing having spring characteristics that cause the opposed sides of said slit to grip said wheel's rim throughout substantially the entire length of said tubing after being seated on said wheel's rim, and thereafter seating said tubing on said wheel's rim so as to protect said rim against scratching and marring from, as well as to provide a bearing surface for, a tire mount/demount tool during rotation of that tool about the rim as the tire is mounted onto or demounted from said wheel.

2. A method as set forth in claim 1, said method including the further step of notching said tubing at one end thereof, said notch intersecting said slit to allow said tubing to be more easily installed over and seated on said wheel's rim.

3. A method as set forth in claim 1, said method including the step of providing a length of tubing that is adapted to serve any diameter wheel between about 13 inches and about 16 inches.

4. A method as set forth in claim 1 wherein said tubing is fabricated of a nylon.

* * * * *